United States Patent [19]

Britt

[11] Patent Number: 4,864,012

[45] Date of Patent: Sep. 5, 1989

[54] PROCESS FOR THE REMOVAL OF A SOLUTE FROM A SOLUTION

[75] Inventor: Thomas R. Britt, Denham Springs, La.

[73] Assignee: The Dow Chemical Company

[21] Appl. No.: 812,587

[22] Filed: Dec. 23, 1985

[51] Int. Cl.$^4$ .................... C08G 65/38; B01D 15/06; B01J 1/09

[52] U.S. Cl. .................... 528/210; 528/482; 528/500; 528/501; 526/67; 526/70; 210/676; 210/689; 210/690; 210/691; 210/693; 210/694

[58] Field of Search ............... 528/210, 500, 501, 482; 526/67, 70; 210/676, 689, 690, 691, 692, 693, 694

[56] References Cited

U.S. PATENT DOCUMENTS

| | | | |
|---|---|---|---|
| 3,631,163 | 2/1967 | Witt | 528/482 |
| 4,067,854 | 1/1978 | Fiorentino | 528/482 |
| 4,250,270 | 2/1981 | Farrar | 528/482 |
| 4,423,207 | 12/1983 | Flock et al. | 528/500 |
| 4,504,654 | 3/1985 | Duffy | 528/500 |

Primary Examiner—John Kight
Assistant Examiner—M. L. Moore

[57] ABSTRACT

This invention relates to a process for removing a solute from a solution. The process comprises maintaining the solution at reflux conditions to produce a vapor which evolves from the reaction solution. At least a portion of the vapor is removed from the zone and is contacted, outside of the reaction zone, with a solid removal agent which is specific for capturing to itself that portion of the vapor which was the solute to be removed and originally present in the reaction solution. After such capture, the remaining vapor is condensed and returned to the reaction zone. In another embodiment, the solute is removed from the solution by first maintaining the solution at reflux conditions in a zone to produce a vapor which evolves from the solution. At least a portion of that vapor is removed from the zone and condensed. The resultant condensate is contacted, outside of the reaction zone, with a solid removal agent which is specific for capturing unto itself the solute from the condensate. The remaining condensate is returned to the zone.

20 Claims, 1 Drawing Sheet

PROCESS FOR THE REMOVAL OF A SOLUTE FROM A SOLUTION

BACKGROUND OF THE INVENTION

This invention relates to a process for the removal of a solute from a solution. Such a process is especially useful when the solute is a reaction by-product and is being removed from a reaction solution.

It has long been recognized that some equilibrium reactions, e.g., condensation reactions, can be driven to completion by removing from the reaction mix one or all of the reaction by-products. Such removal is not difficult if the reaction mix is solely a liquid. In these cases, the liquid by-product is removed by adding, to the reaction mix, a solid removal agent, such as a powder-type molecular sieve, which is specific for capturing to itself the by-product sought to be removed. Once the by-product capture is achieved, simple solid-liquid separation is used to separate the reaction mix from the removal agent and its captured by-product. The separated removal agent may be regenerated and returned to the reaction mix for further duty.

If the reaction mix is a liquid-solid mix and the solid is the by-product sought for removal, then conventional liquid-solid separation is useful. However, if the solid is the product sought and the by-product is a solute in the liquid phase of the reaction mix, then a difficult problem is presented. The addition of a solid removal agent to remove the liquid by-product is not an attractive solution as it is difficult, in many cases, to separate the solid product from the solid removal agent and its captured by-product. In the alternative, the liquid phase of the mix can be subjected to distillation techniques to effect removal of the by-product from the liquid phase. Such techniques, however, are not always efficient and inexpensive—indeed, the contrary is the case when the by-product and the liquid phase have similar boiling points.

It is therefore an object of the invention to provide a process for the efficient removal of a solute from a solution. It is a further object of this invention to effect such removal even when solids are present in admixture with the solution. It is still a further object of the invention to provide a process for driving an equilibrium reaction towards completion by efficiently removing from the reaction system at least one of the reaction by-products even when the reaction system is a liquid-solid mix and the by-product is a solute in the liquid phase of the mix.

THE INVENTION

In one embodiment of this invention, a solute is removed from a solution, by first maintaining, in a zone or a vessel, the solution at reflux conditions so that a vapor is evolved from the solution. At least a portion of this evolved vapor is removed from the zone or vessel. Subsequent to such removal, the vapor is contacted with a solid removal agent which captures to itself that constituent of the vapor which was at least a portion of the solute to be removed and originally present in the solution. The remaining vapor is condensed and returned to the zone or vessel.

In another embodiment of the process of this invention, the solution from which the solute is to be removed is also maintained at reflux conditions in a zone or vessel. The resultant vapor from the solution is removed from the reaction zone and is condensed to form a liquid which is in turn contacted with a removal agent which is specific for the capture to itself of the solute which is the subject of removal. The remaining liquid is then separated from the solid removal agent and its captured solute by conventional solid-liquid separation techniques. Subsequent to this separation, the remaining condensate is returned to the zone or vessel.

The two embodiments of this invention are especially useful in removing reaction by-products from reaction liquid-solid mixes wherein one of the reactants is a solid or the desired product of the reaction forms as a precipitate. Since, in accordance with this invention, the solid removal agents are not placed into the reaction liquid, there is no need to separate the precipitated product and the solid removal agents from on another after reaction completion. Also, as can be seen from the foregoing description of two embodiments of this invention, the process steps are operationally simple and thus do not involve the more complicated steps used by distillation techniques to remove a solute from a solution. Note further that the processes described are not any more complicated when the solute to be removed and other constituents of the reaction liquid solution have similar boiling points.

The solid removal agents used in accordance with this invention can be any of those known to the art so long as they are not soluble in or reactive with the solution to be treated. The removal agent may be either a natural or synthetic adsorbent. Exemplary of useful adsorbents are: activated carbon, silica gel, activated alumina, Fuller's Earth, diatomaceous earth, activated bauxite and molecular sieves. Molecular sieves are especially preferred for use in the process of this invention as they adsorb small molecules only, are selective of molecular shape and have a particular affinity for unsaturated and polar molecules. Alumino silicates which have undergone heating to remove water of hydration are often used to provide molecular sieve material. Other types of removal agents may be used, for example, hydrophilics, such as solid alkali metal hydroxides, e.g., LiOH, NaOH, KOH, etc., and various salts, e.g., $K_2CO_3$, $Na_2CO_3$, $MgSO_4$, $CuSO_4$, etc.

The solid removal agents are specific for the particular material to be removed from the solution. To affect the direction of reaction equilibrium, common materials, such as water, HCl, HBr, methanol or ethanol are the subject of removal.

In some instances, there will be a need to remove two or more solutes from a particular solution. In these cases, the removal agent may need to be a combination of substances, each member of the combination being specific for one of the solutes to be removed.

These and other features of this invention contributing to satisfaction in use and economy in manufacture will be more fully understood from the following description of preferred embodiments of the invention when taken in connection with the accompanying drawings in which identical numerals refer to identical parts and in which.

Figure 1:
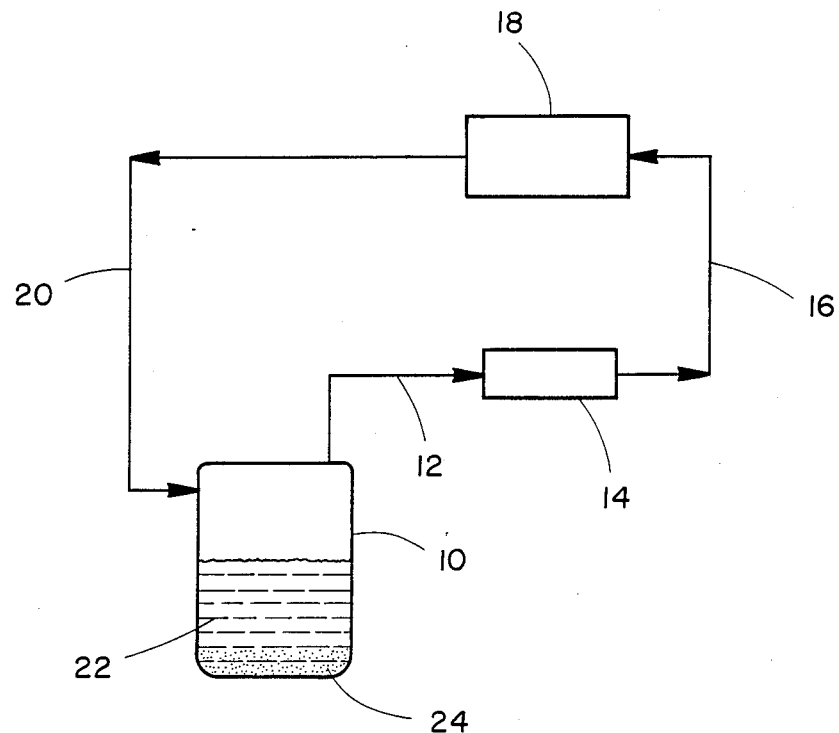
FIG. 1 is a schematic view of a first process of this invention.

Referring now to FIG. 1, there can be seen a reaction vessel 10 which contains a reaction solution 22 and a precipitate 24. For the embodiment shown, precipitate 24 is a product of the reaction occurring within reaction solution 22. Contained within reaction solution 22 is a by-product solute. The reaction occurring within reaction solution 22 is of the type that can be pushed towards completion if the by-product solute is removed from or at least reduced in concentration in reaction solution 22.

Reaction solution 22 is heated so that it is brought to a refluxing condition. The vapor evolving from the surface of reaction solution 22 is passed, via line 12, to adsorber 14. Adsorber 14 contains a removal agent which will selectively capture to itself the by-product solute which is a constituent of the vapor fed to adsorber 14.

After adsorption, the remainder of the vapor is removed from adsorber 14 and passed to condenser 18 by way of line 16. Condenser 18 cools the vapor to yield a condensate which is fed via line 20 to vessel 10. As can be appreciated, the undesirable by-product concentration in the system is continuously reduced thus favoring the degree of completion obtainable by the reaction occurring in reaction solution 22.

Figure 2:
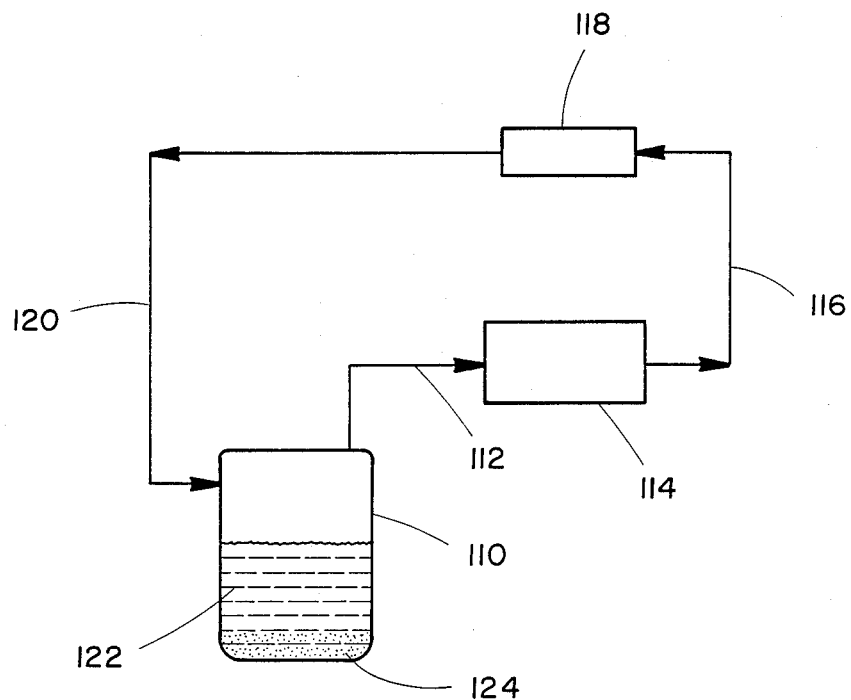
FIG. 2 is a schematic view of a second process of this invention.

Another embodiment of this invention is shown in FIG. 2. In FIG. 2, there is a reaction vessel 110 which contains a reaction solution 122 and a precipitate 124. Precipitate 124 can be a product of the reaction occurring within reaction solution 122. As was the case for the embodiment of FIG. 1, a by-product solute which is partially determinative of reaction completion is present in reaction solution 122. Reaction solution 122 is heated to bring it to refluxing condition. The vapor which evolves from the surface of reaction solution 122 is fed, via line 112, to condenser 114 wherein the fed vapor is cooled to produce a condensate. This condensate is fed from condenser 114 by way of line 116 to adsorber 118. Adsorber 118 contains a removal agent which is specific for the by-product solute which is being sought for removal from the reaction system. After adsorption, the remainder of the condensate is fed from adsorber 118 by wa of line 120 to reaction vessel 110. As is the case for the embodiment shown in FIG. 1, the constant removal of the undesirable solute by-product results in a enhancement in the degree of completion for the reaction occurring within reaction solution 122.

EXAMPLE 1

A 250 ml, three-necked, round-bottomed flask was equipped with: a gas inlet tube, a magnetic stir bar, adapted soxhlet extractor (with 4A molecular sieves obtained from Aldrich Chemical Company and a stopper. To this flask was added 4 g of 1,2-Bis(4-aminophenoxy)ethane and 4.42 g of 1,2-Bis(4-formylphenoxy)ethane and 100 ml of dimethylformamide. The mixture was stirred and brought to reflux conditions and refluxed through the extractor under a nitrogen purge for 6 hours. Water by-product was removed in the extractor with the remaining solution being returned to the reaction zone. A precipitate was produced and filtered from the dimethylformamide solution. The precipitate was air dried and then dried in a vacuum oven at 60° C. for 3 hours. The precipitate was poly(oxyethyleneoxy-1,4-phenylenenitrilomethylidene-1,4-phenylenemethylidenenitrilo-1,4-phenylene). The precipitate weighed 7.4 g which indicated a 94% yield for the reaction. The water co-produced with the precipitate was removed by use of the above-described molecular sieves. No removal agents were utilized in the reaction solution. Without removal of the water by-product, reaction yields as low as 30% could be expected.

EXAMPLE 2

The same apparatus used in Example 1 was used in this Example. To the flask was added 4 g of 1,10-Bis(4-aminophenoxy)decane and approximately 100 ml of dimethyl formamide. The resultant mixture was stirred to place the diamine in solution. To the resultant solution was added 3.03 g of 1,2-Bis(4-formylphenoxy)ethane and an additional 50 ml of dimethyl formamide. The reaction mixture was held under reflux conditions for 3 hours. By-product water was removed upon passing the refluxed solution through the extractor. A slightly yellowish precipitate was noted. The precipitate was filtered from the reaction solution and washed with ethanol and dried. The precipitate was poly(oxydecamethyleneoxy-1,4-phenylenenitrilomethylidene-1,4-phenylenemethylidenenitrilo-1,4-phenylene). The precipitate weighed 5.69 g which represents an 86% yield for the reaction when water by-product is reduced in concentration in the reaction solution by its removal in the extractor.

In the two foregoing Examples, it can be seen that removal of the water by-product enhanced the reaction yield. Water removal was achieved in both cases by contacting the refluxed solution with the molecular sieves provided in the soxhlet extractor. By utilizing this procedure, no removal agent was present in the reaction solution so that subsequent difficult solid-solid separations did not have to be performed to recover the desirable precipitate produced by the reaction.

I claim:

1. A process for removing a solute which is a by-product of the reaction occurring in said reaction solution, from a refluxing reaction solution, said process comprising:
   (a) maintaining, in a reaction zone, said reaction solution at reflux conditions to produce a vapor evolving from said reaction solution;
   (b) removing at least a portion of said vapor from said reaction zone;
   (c) contacting said vapor with a removal agent outside of said reaction zone, said removal agent being specific for the removal from said vapor of the constituent which was the solute to be removed from said reaction solution;
   (d) condensing at least a portion of the remaining vapor from (c); and
   (e) returning the resultant condensate from (d) to the reaction zone.

2. The process of claim 1 wherein the solute is water.

3. The process of claim 2 wherein the solute is a hydrohalide acid.

4. The process of claim 1 wherein the reaction solution contains a precipitate.

5. The process of claim 4 wherein said precipitate is produced by the reaction occurring in said reaction solution.

6. The process of claim 1 wherein said solute is water and said removal agent is a molecular sieve.

7. The process of claim 1 wherein said solute is water and said removal agent is hydrophilic.

8. The process of claim 7 wherein said removal agent is $CuSO_4$.

9. The process of claim 4 wherein the reaction occurring in said reaction solution is a condensation polymer reaction.

10. The process of claim 9 wherein the solute is water and said removal agent is a molecular sieve.

11. A process for removing a solute which is a by-product of the reaction occurring in said reaction solution, said process comprising:
  (a) maintaining, in a reaction zone, said reaction solution at reflux conditions to produce a vapor evolving from said reaction solution;
  (b) removing at least a portion of said vapor from said reaction zone;
  (c) condensing at least a portion of said removed vapor;
  (d) contacting said condensate from (c) with a removal agent outside of said reaction zone, said removal agent being specific for the removal of said solute from said condensate; and
  (e) returning the resultant condensate from (d) to the reaction zone.

12. The process of claim 11 wherein the solute is water.

13. The process of claim 11 wherein the solute is a hydrohalide acid.

14. The process of claim 11 wherein the reaction solution contains a precipitate.

15. The process of claim 14 wherein said precipitate is produced by the reaction occurring in said reaction solution.

16. The process of claim 11 wherein said solute is water and said removal agent is a molecular sieve.

17. The process of claim 15 wherein said solute is water and said removal agent is hydrophilic.

18. The process of claim 17 wherein said removal agent is $CuSO_4$.

19. The process of claim 11 wherein the reaction occurring in said reaction solution is a condensation polymer reaction.

20. The process of claim 19 wherein the solute is water and said removal agent is a molecular sieve.

* * * * *

UNITED STATES PATENT AND TRADEMARK OFFICE
CERTIFICATE OF CORRECTION

PATENT NO. :   4,864,012

DATED   :  September 5, 1989

INVENTOR(S) :  Thomas R. Britt

It is certified that error appears in the above-identified patent and that said Letters Patent is hereby corrected as shown below:

Column 2, line 15, "on" should read -- one --.   Column 3, line 39, "wa" should read -- way --; column 3, line 41, "a" should read -- an --.
In the Claims:
--.  Claim 9, column 4, line 64, "claim 4" should read -- claim 5 --.
Claim 17, "claim 15" should read -- claim 11 --.  Claim 19, "claim 11" should read -- Claim 15 --.

Signed and Sealed this

Twenty-fifth Day of September, 1990

Attest:

HARRY F. MANBECK, JR.

*Attesting Officer*   *Commissioner of Patents and Trademarks*